US005729267A

United States Patent [19]

Shimada et al.

[11] Patent Number: 5,729,267
[45] Date of Patent: Mar. 17, 1998

[54] IMAGE FORMING APPARATUS HAVING IMAGE TRANSFER WITH TONER CLEANING FUNCTION

[75] Inventors: Akira Shimada; Masashi Yamamoto; Hiroyuki Tadokoro, all of Hitachi, Japan

[73] Assignee: Hitachi, Ltd., Tokyo, Japan

[21] Appl. No.: 235,809

[22] Filed: Apr. 29, 1994

[30] Foreign Application Priority Data

Apr. 30, 1993 [JP] Japan .................................. 5-104376

[51] Int. Cl.$^{6}$ .............................. B41J 2/385; B41J 2/41; G01D 15/06; G03G 15/14

[52] U.S. Cl. .......................... 347/111; 347/112; 355/271

[58] Field of Search .................................. 347/111, 112; 355/226, 326 R, 274, 271

[56] References Cited

U.S. PATENT DOCUMENTS 4,509,850 4/1985 Weigl ...................................... 355/226
5,132,738 7/1992 Nakamura et al. ...................... 355/272
5,287,127 2/1994 Salmon ............................... 355/326 R

*Primary Examiner*—N. Le
*Assistant Examiner*—Raquel Yvette Gordon
*Attorney, Agent, or Firm*—Antonelli, Terry, Stout & Kraus, LLP

[57] ABSTRACT

Image forming apparatus having a photosensitive drum 1, a charger 2 for uniformly charging the photosensitive drum 1, an exposing means 3 for forming an electro-static latent image on the photosensitive drum 1, an exposing unit 4 for forming a visual image by developing the electro-static latent image, a transfer roller for transferring the visual image to a printing medium 10, which comprises a transfer voltage supply circuit that supplies the transfer roller 5 one or more times with voltage in one polar direction and successively in the other polar direction during an interval after starting of operation of the image forming apparatus and before the time when the printing medium 10 is transported to the transfer roller 5. By controlling in such a way, an image forming apparatus is provided in which memory effect does not arise, the transfer roller 5 being prevented from having accumulated toner attached thereto, the toner attached to the transfer roller 5 being cleaned, and so the reverse side surface of the printing medium 10 is not stained.

7 Claims, 5 Drawing Sheets

IMAGE FORMING APPARATUS HAVING IMAGE TRANSFER WITH TONER CLEANING FUNCTION

BACKGROUND OF THE INVENTION

The present invention relates to an image forming apparatus utilizing an electro-photographic method and, more particularly, to an image forming apparatus utilizing an electro-photographic method which prevents the reverse side surface of the printing medium from being stained with toner attached on a transfer means when a toner image formed on an image holding member is transferred to the printing medium.

In some types of image forming apparatuses such as image forming apparatus for obtaining an image of a single color (mono-color) visual image, or a color image forming apparatus for obtaining a multi-colored image having two or more colors or obtaining a full colored image by superposing various toner images, a transfer roller is sometimes used for transferring a visual image to a printing medium. However, at starting of operation of the image forming apparatus or at non-feeding paper time (non-passing paper time) between one printing paper and the following printing paper during continuous feeding of sheets of the printing medium (printing paper or OHP sheet) in the case of using the transfer roller described above, when a sheet of printing paper is transported to the transfer roller on which toner is attached, the toner attaches on the reverse side surface of the printing paper to cause so-called reverse-side-stain.

A method for preventing the reverse side stain is described in Japanese Patent Application Laid-Open No. 3-69978 (1991). In that method the apparatus has a transfer roller for transferring a toner image formed on an image holding member (photosensitive member), and a bias to be applied to said transfer roller during absence of printing paper is applied to the transfer roller in a given polarity for a time longer than the time required for one rotation of the transfer roller, and then a bias is applied to the transfer roller in the reverse polarity for a time longer than the time required for one further rotation of the transfer roller.

However, in that method, when toner charged in a correct polarity exists on an image holding member, the toner is apt to be attached to the transfer roller since the toner is attracted to the transfer roller. Therefore, it is impossible to prevent printing paper from producing the reverse side stain. Further, since the printing paper is applied with a voltage having the reverse polarity to the charged polarity on the image holding member during absence of printing paper, it inevitably causes a memory effect. Furthermore, since the bias is applied to the transfer roller in a given polarity for a time longer than the time required for one rotation of the transfer roller and then is applied to the transfer roller in the reverse polarity for a time longer than the time required for one further rotation of the transfer roller, the time interval of preventive treatment against producing the reverse side stain on the printing paper becomes longer, which causes a disadvantage in that it takes a long printing time when continuous printing is performed.

SUMMARY OF THE INVENTION

The present invention aims to eliminate the problems described above. A first object of the present invention is to provide an image forming apparatus wherein reverse side stain of the printing medium is not caused by not causing the memory effect, preventing toner attaching to the transfer roller, and cleaning the toner attached on the transfer roller.

A second object of the present invention is to provide an image forming apparatus which is capable of smoothly performing a continuous printing or color printing by shortening the time for the preventive treatment against the reverse side stain of printing medium.

The first and second objects of the present invention described above can be attained by providing an image forming apparatus which has an image holding member, charging means for uniformly charging said image holding member, exposing means for forming an electro-static latent image on said image holding member which has been charged uniformly, visual image forming means for forming a visual image by developing said electro-static latent image, and transfer means for transferring said visual image to a printing medium, wherein said transfer means is applied once or more times with voltage in one polar direction and successively in the other polar direction during an interval after the starting of operation of the image forming apparatus and before the time when said printing medium is transported to said transfer means.

The first and second objects of the present invention described above can be attained by providing an image forming apparatus which has an image holding member, exposing means for forming electro-static latent images on said image holding member which has been charged uniformly, visual image forming means for forming each color of visual images by successively developing said electro-static latent images with a plurality of color developers, an intermediate transfer roller for forming a discrete color visual image by partially contacting with said image holding member and superposing said each color of visual images, and transfer means for transferring said discrete color visual image to a printing medium being selectively controlled and driven in touching state and in detaching state to said intermediate transfer roller, wherein said transfer means is applied once or more times with voltage in one polar direction and successively in the other polar direction during an interval after the starting of operation of the image forming apparatus and before the time when said printing medium is transported to said transfer means.

In a case where an image is directly transferred from the image holding member to a printing paper, according to the voltage applying means described above, the transfer means is applied once or more times with voltage in one polar direction and successively in the other polar direction during an interval after the starting of operation of the image forming apparatus and before the time when the printing medium is transported to said transfer means, and further during the interval in which neither of the charging means for uniformly charging the surface of the image holding member nor the exposing means for forming an electro-static latent image on said image holding member charged uniformly are applied with operating voltage. Therefore, the toner attached on the transfer roller can be cleaned under a condition that the toner present on the image holding member is prevented from attaching to the transfer roller. Therewith, the reverse side stain of the printing medium is not caused, and transference of an excellent toner image can be performed. Furthermore, the memory effect on the image holding member due to non-operation of the charging means is not caused. Since the preventive treatment against the reverse side stain of the printing medium is performed only at starting of operation of the image forming apparatus, the waiting time for the treatment is eliminated, and a continuous printing can be smoothly performed.

In a case of using an intermediate transfer member, according to the voltage applying means described above, the transfer means is applied once or more times with voltage in one polar direction and successively in the other polar direction during an interval after the starting of operation of the image forming apparatus and before the time when the printing medium is transported to said transfer means, and further during the interval neither of the charging means for uniformly charging the surface of the image holding member nor the exposing means for forming an electro-static latent image on said image holding member charged uniformly is applied with operating voltage. Therefore, the color toner attached on the transfer roller and/or the intermediate transfer member can be cleaned under a condition that the color toner present on the image holding member is prevented from attaching to the transfer roller. Therewith, the reverse side stain of the printing medium is not caused, and transference of an excellent multi-color toner image can be performed. Furthermore, the memory effect on the image holding member due to non-operation of the charging means is not caused. Since the preventive treatment against the reverse side stain of the printing medium is performed only at starting of operation of the color image forming apparatus, the waiting time for the treatment is eliminated, and a continuous printing can be smoothly performed.

DETAILED DESCRIPTION OF THE PREFERRED EMBODIMENTS

Figure 1:
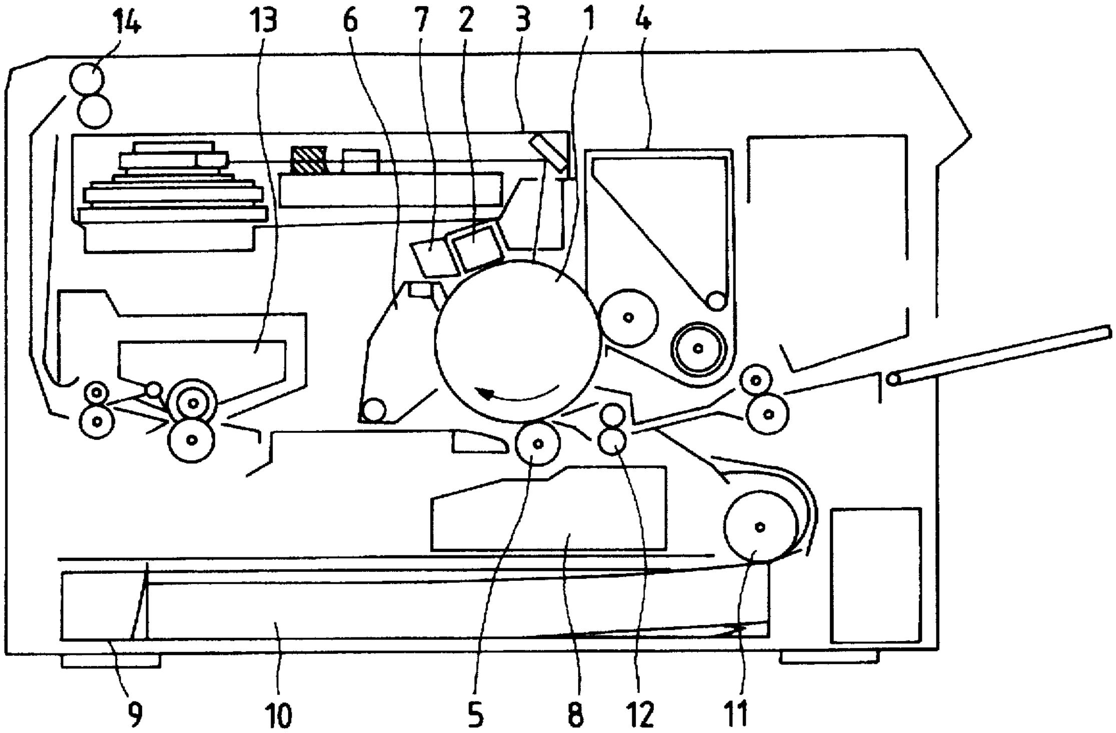
FIG. 1 is a cross-sectional view showing the construction of first embodiment of an image forming apparatus according to the present invention.

FIG. 1 is a cross-sectional view showing the construction of a first embodiment of an image forming apparatus according to the present invention.

In FIG. 1, the numeral 1 is a photosensitive drum (image holding member), the numeral 2 being a charger, the numeral 3 being an exposing means, the numeral 4 being a developing unit (visual image forming means), the numeral 5 being a transfer roller (transfer means), the numeral 6 being a drum cleaner, the numeral 7 being an erase lamp, the numeral 8 being a transfer voltage control and generating circuit, the numeral 9 being a paper feed cassette, the numeral 10 being printing paper (printing medium), the numeral 11 being a pick-up roller, the numeral 12 being a registration roller, the numeral 13 being a fixing unit, the numeral 14 being a paper extract roller.

The photosensitive drum 1 is constructed such as to rotate in the direction of the arrow shown in the figure, and around the photosensitive drum 1 there are parts arranged in the order of the charger 2, the exposing means 3, the developing unit 4, the transfer roller 5, the drum cleaner 6 and the erase lamp 7. The paper feed cassette 9 containing the printing paper 10 is placed under the photosensitive drum 1. Along the printing paper transporting passage from the paper feed cassette 9 to the paper extract roller 14 through the transfer roller 5, there are parts arranged in the order of the pick-up roller 11, the registration roller 12 and the fixing unit 13. The transfer voltage control and generating circuit 8 is placed between the photosensitive drum 1 and the paper feed cassette 9. The charger 2 comprises a corona wire discharging unit, and the exposing means 3 has a laser optical system. The developing unit 4 has a developing roller which rotatably contacts the photosensitive drum 1. The transfer roller 5 has a metallic shaft and an elastic layer having a given electric resistivity, for example $10^4$ to $10^{10}$ Ωcm, on its periphery. The contacting portion between the photosensitive drum 1 and the transfer roller 5 forms a transferring portion. The drum cleaner 6 comprises an elastic blade contacting the photosensitive drum 1 and a toner recovering container. The erase lamp 7 has a photo-diode for irradiating the photosensitive drum 1.

The outline of the operation of the image forming apparatus having the above structure will be described below.

On starting of rotation of the photosensitive drum 1 to perform image printing, the charger 2 uniformly charges the surface of the photosensitive drum 1 with a specified voltage (for example −600V), and then the exposing means 3 exposes the uniformly charged photosensitive drum 1 corresponding to an image signal to form an electro-static latent image on the photosensitive drum 1. Next, the developing unit 4 reversely develops the electro-static latent image formed on the photosensitive drum 1 using toner with developing bias voltage of −300V to −450V to form a visual image (toner image). The visual image obtained here is transported to the transfer portion by rotation of the photosensitive drum 1. With the starting of the rotation of the photosensitive drum 1, the pick-up roller 11 and the registration roller 12 are started to rotate, and the printing paper 10 in the paper feed cassette 9 is entered to a printing paper transporting portion by engaging with the pick-up roller 11 which has been started to rotate. Then the printing paper 10 is transported to the transfer portion through the rotating registration roller 12 synchronized with the transportation of the visual image on the photosensitive drum 1 to the transfer portion. On this occasion, the toner image on the photosensitive drum 1 is transferred to the printing paper 10 with the transfer voltage applied to the transfer roller 5. Then the printing paper 10 is transported along the transporting passage to the fixing unit 13 to fix the toner image and is extracted to the outside of the image forming apparatus through the paper extract roller 14. On the other hand after the photosensitive drum 1 has transferred the toner image to the printing paper 10, the toner remaining on the photosensitive drum 1 is recovered with the drum cleaner 6, and then the remaining voltage on the photosensitive drum 1 is removed with the erase lamp 7. Thus a series of image forming processes is completed.

Figure 2:
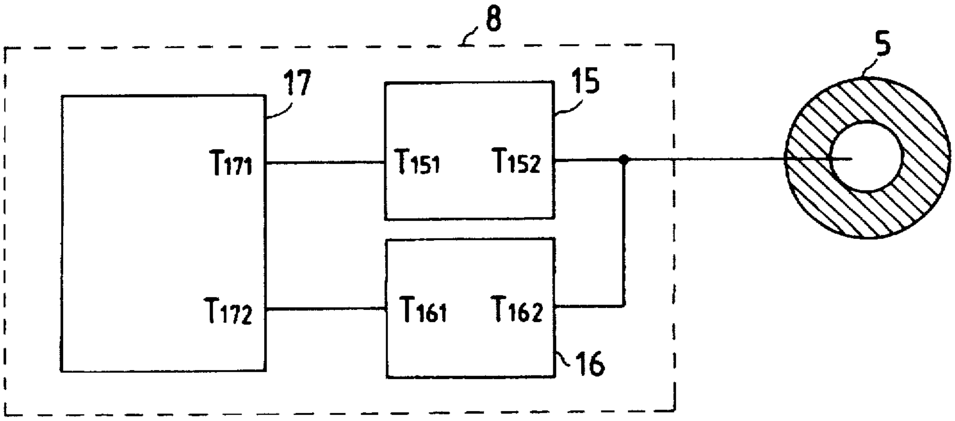
FIG. 2 is a construction block diagram of an embodiment of a transfer voltage control and generating circuit shown in FIG. 1.

FIG. 2 is a construction block diagram of an embodiment of a transfer voltage control and generating circuit 8 shown in FIG. 1.

In FIG. 2, the numeral 15 indicates a high voltage generator having positive polarity, the numeral 16 being a high voltage generator having negative polarity, the numeral 17 being a CPU (central processing unit) and the other numerals identifying the same components having the same numerals in FIG. 1.

The high voltage generator 15 having positive polarity has a first and a second terminals $T_{151}$, $T_{152}$, the high voltage generator 16 having negative polarity having a first and a second terminals $T_{161}$, $T_{162}$, the CPU 17 having a first and a second terminals $T_{171}$, $T_{172}$. The first terminal $T_{151}$ and the second terminal $T_{152}$ in the high voltage generator 15 having positive polarity are connected to the first terminal $T_{171}$ in the CPU and to the transfer roller 5, respectively. The first terminal $T_{161}$ and the second terminal $T_{162}$ in the high voltage generator 16 having negative polarity are connected to the second terminal $T_{172}$ in the CPU and to the transfer roller 5, respectively.

Figure 3:
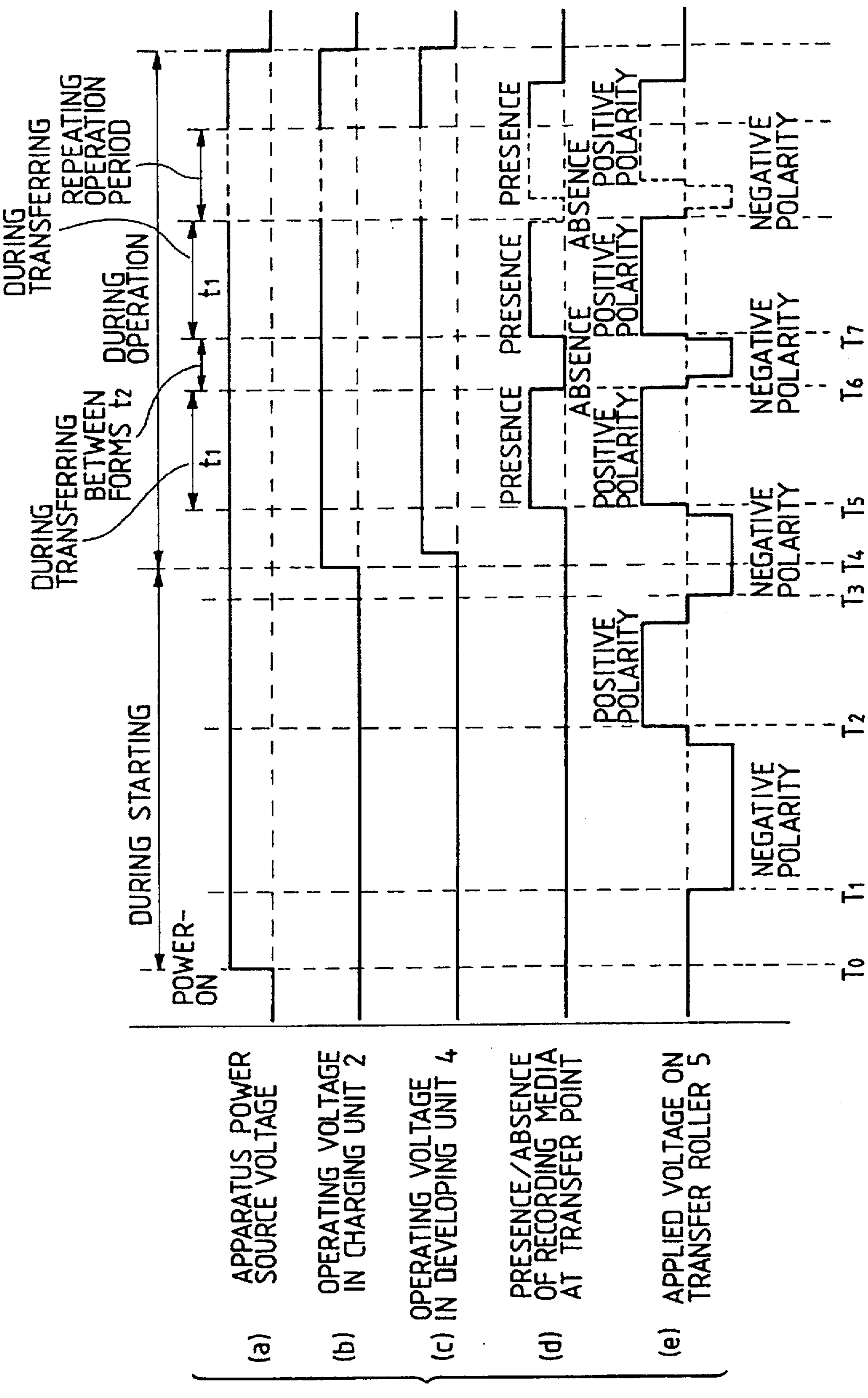
FIG. 3 is a timing chart showing an example of change in voltage applying state in a first embodiment.

FIG. 3 is a timing chart showing an example of changes in voltage applying states in the construction shown in FIG. 1 and FIG. 2

FIG. 3, (a) shows power source voltage for the image forming apparatus, (b) shows the operating voltage of the charger 2, (c) shows the operating voltage of the developing unit 4, (d) shows the presence/absence of the printing paper 10 in the transfer position, and (e) shows the voltage applied to the transfer roller 5.

Explanation will be given of the voltage applied state of each of the portions and of the corresponding operation of each of the portions during the starting period and during operation in the embodiment shown in FIG. 1, referring to FIG. 2 and FIG. 3.

Firstly, at time $T_0$ the power of the image forming apparatus is switched on. On building-up of the power source voltage, the image forming apparatus starts to operate. On this occasion, the power source switching-on described above is not limited to that at the beginning of routine use of the image forming apparatus, but includes the switching-on again of the image forming apparatus after solving a trouble such as a jam. At this time, the charger 2 and the developing unit 4 are not supplied with operating voltage, and the transfer roller 5 is not applied with voltage, nor is the transfer portion supplied with printing paper.

Next, at time $T_1$, the photosensitive drum 1 and the transfer roller 5 are rotated. Concurrently, the CPU 17 supplies the high voltage power source 16 having negative polarity with a control signal in order to operate the high voltage power source 16 having negative polarity to supply the transfer roller 5 with negative polar voltage of −400 to −600V for a first term of a certain interval, for example 10 to 60 seconds.

Then, at time $T_2$ after the first term, the CPU 17 transmits a signal to the high voltage power source 15 having positive polarity to supply the transfer roller 5 with positive polar voltage of 400 to 1000V for a second term of a certain interval, for example 5 to 20 seconds.

Further, at time $T_3$ after the second term, the CPU 17 again transmits a signal to the high voltage power source 16 having negative polarity to supply the transfer roller 5 with the negative polar voltage of −400 to −600V.

And at time $T_4$ during the state where the negative voltage of −400 to −600V is being supplied to the transfer roller 5, the starting-up period is completed and the apparatus enters the operating period where the image forming apparatus is capable of performing image printing. In the operating period, the charger 2 is supplied with operating voltage, then the developing unit 4 is also supplied with operating voltage. Further, the units placed around the photosensitive drum 1, such as the exposing means, for example a laser optical system, and the erase lamp 7 enter into an operating state and are capable of performing their given functions. However, the printing paper 10 is not yet fed to the transfer portion.

At the time $T_5$ when the front end of the printing paper 10 is transported to the point of the transfer portion, the CPU 17 transmits a signal to the high voltage power source 15 having positive polarity to supply the transfer roller 5 with positive polar voltage of 400 to 1000V in order to transfer the visual image (toner image) formed on the photosensitive drum 1 to the printing paper 10. On this occasion, during the transfer interval $t_1$, where the positive polar voltage is applied to the transfer roller 5, control is performed not corresponding to the timing control of printing range for the pick-up roller 11, the registration roller 12 or the exposing means 3. At the time $T_6$ when the rear end of the printing medium (printing paper) 10 has passed the point of the transfer portion, the supplying of the transfer voltage having positive polarity is stopped. During the non-transfer interval after the transfer voltage having positive polarity is stopped and before the next transfer voltage having positive polarity is supplied, that is, the between-paper interval $t_2$ between one printing paper 10 and the next printing paper 10, the CPU 17 transmits a signal to the high voltage power source 16 having negative polarity to supply the transfer roller 5 with negative polar voltage of −400 to −600V.

At the time $T_7$ when the front end of the next printing paper 10 is transported to the point of the transfer portion, the CPU 17 again transmits a signal to the high voltage power source 15 having positive polarity to supply the transfer roller 5 with positive polar voltage of 400 to 1000V for the next transfer interval $t_1$ in order to transfer the visual image (toner image) formed on the photosensitive drum 1 to the next printing paper 10.

The operation following the above is a repetition of the operation described above. During each transfer interval $t_1$ when each transfer printing paper 10 is transported to the point of the transfer portion, the transfer roller 5 is supplied with the positive polar transfer voltage of 400 to 1000V to perform transference of the visual image to the printing paper 10. On the other hand, during each non-transfer interval $t_2$ when the printing paper 10 is absent from the point of the transfer portion, the transfer roller 5 is supplied with the negative polar transfer voltage of −400 to −600V.

Although it has been described in the above embodiment that the transfer roller 5 is supplied once with the negative polar voltage and successively with the positive polar voltage at starting, the present invention does not limit the times of supplying the negative polar voltage and successively the positive polar voltage to once. The times of supplying these voltages may be twice or more. However, it is preferable that the times of supplying voltages be once or twice since the times of supplying voltages more than twice is useless.

The interval to supply the negative polar voltage and the interval to supply the positive polar voltage may be the same or may be different. And the ranges of the negative polar voltage and the positive polar voltage are not limited to the ranges of voltages described above.

According to the present invention, the transfer roller 5 is supplied once or more with the negative polar voltage and successively with the positive polar voltage at the starting of the image forming apparatus. Therefore, whichever polarity the toner held on the photosensitive drum 1 is charged in, the toner is not attracted and attached to the transfer roller 5. Further, since the apparatus has a cleaning function against the toner attached to the transfer roller 5, the toner does not become attached on the reverse side surface of printing paper, and so the reverse side stain is not caused. In this connection, in a conventional image forming apparatus, the cleaning efficiency against the toner attached to the transfer roller cannot be attained above 95%. On the other hand, according to the present invention, it has been confirmed that the cleaning efficiency can be increased to approximately 99%.

Further, it is possible to prevent generating of image defect such as overlap due to memory effect in the photosensitive drum 1. With an excellent transference of visual image, a high quality printing image can be obtained. Furthermore, continuous printing can be also performed smoothly and speedily while keeping an excellent transfer state.

Figure 4:
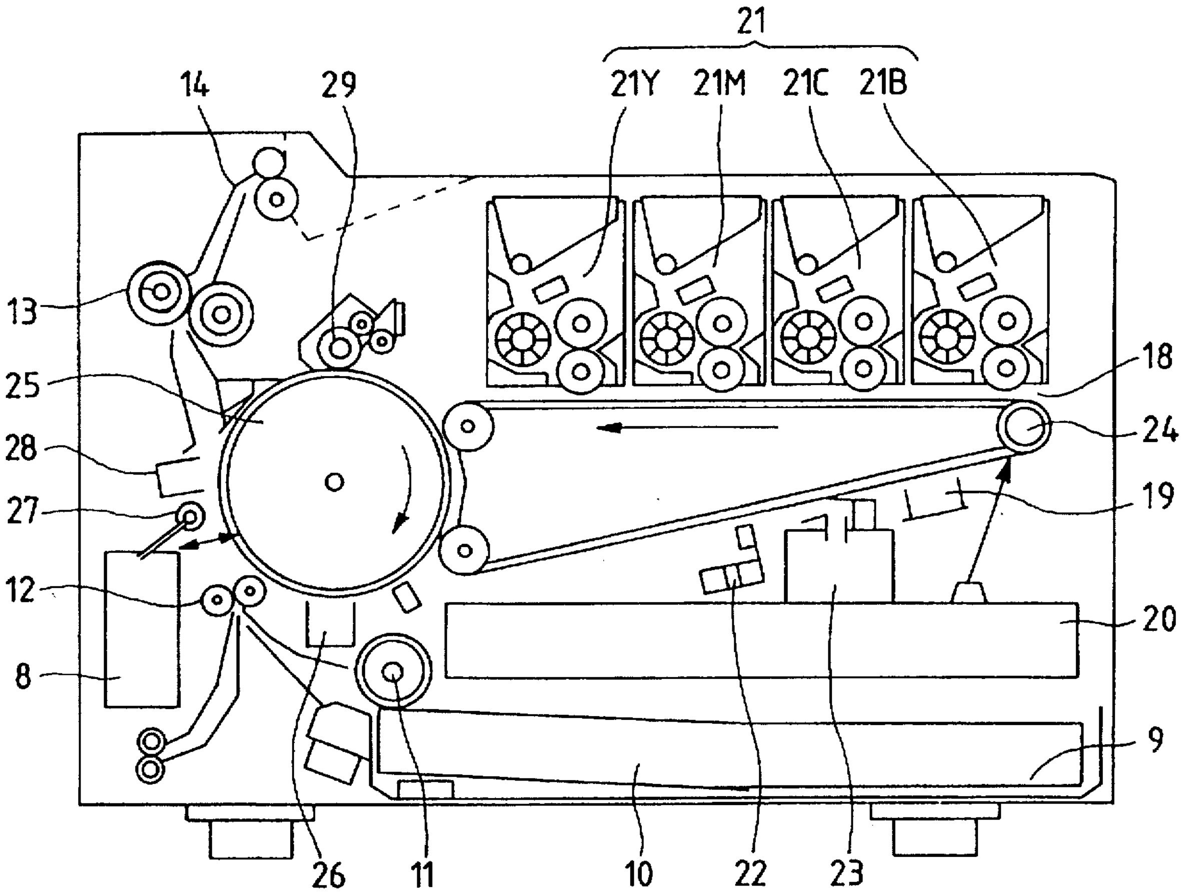
FIG. 4 is a cross-sectional view showing the construction of a second embodiment of an image forming apparatus according to the present invention.

FIG. 4 is a cross-sectional view showing the construction of second embodiment of an image forming apparatus according to the present invention. A color laser printer is constructed as an example of the image forming apparatus.

In FIG. 4, the numeral 18 is a photosensitive belt, the numeral 19 being a charger, the numeral 20 being an exposing means, the numeral 21 being a multi-color developing unit, the numeral 21Y being a yellow color developing unit, the numeral 21M being a magenta color developing unit, the numeral 21C being a cyanic color developing unit, the numeral 21B being a black color developing unit, the numeral 22 being an erase lamp, the numeral 23 being a belt cleaner, the numeral 24 being a rotating shaft, the numeral 25 being an intermediate transfer drum, the numeral 26 being a charger, the numeral 27 being a transfer roller, the numeral 28 being a discharger, the numeral 29 being a drum cleaner, and the other components are identified by the same reference numerals in FIG. 1.

The photosensitive belt 18 has a double layer structure of which the upper layer is a photosensitive layer (for example, made of OPC) and the lower layer is an electric conductive layer (for example, made of aluminum), and belt 18 is stretched over three rotating shafts 24 to be driven in the direction shown by the arrow on the figure. Around the photosensitive belt 18, there are parts arranged in the order of a charger 19, an exposing means 20, a developing unit 21, an intermediate transfer drum 25, an erase lamp 22 and a belt cleaner 23. The intermediate transfer drum 25 is rotated in the direction shown by the arrow in the figure. Around the intermediate transfer drum 25, there are parts arranged in the order of a charger 26, a transfer roller 27, a discharger 28 and a drum cleaner 29. A paper feed cassette 9 containing printing paper 10 is placed under the photosensitive belt 18. Along the printing paper transporting passage from the paper feed cassette 9 to the paper extract roller 14 through the transfer roller 27, there are parts arranged in the order of the pick-up roller 11, the registration roller 12 and the fixing unit 13. A transfer voltage control and generating circuit 8 is placed beside the intermediate transfer drum 25.

In this case, the charger has a corotron charger performing corotron wire discharge, and the exposing means 20 has a laser optical system composed of a laser generating diode, a lens, a polygon mirror and a drive motor and so on. The developing unit 21 is composed of a yellow color developing unit 21Y, a magenta color developing unit 21M, a cyanic color developing unit 21C and a black color developing unit 21B containing yellow color toner, magenta color toner, cyanic color toner and black color toner, respectively. The intermediate transfer drum 25 is of a cylindrical shape having a diameter of, for example, 80 to 150 mm, having a double layer structure composed of an electric conductive cylindrical base body (for example, made of aluminum) and an insulating layer (for example, urethane resin layer having its surface coated with fluorocarbon resin) formed thereon, the electric conductive cylindrical base body being grounded. The intermediate transfer drum 25 and the photosensitive belt 18 are pressed to each other with a proper pressure and are in contact to each other with a nip width approximately 5 to 20 mm. Both of the intermediate transfer drum and the photosensitive belt may be driven, or either of the two may be driven. The transfer roller 27 has a metallic shaft and an elastic layer having a given electric resistivity (for example $10^4$ to $10^{10}$ Ωcm) on its periphery.

The outline of the operation of the image forming apparatus having the above structure will be described below.

On starting of moving of the photosensitive belt 18 to perform image printing, the charger 19 uniformly charges the surface of the photosensitive belt 18, and then the exposing means 20 exposes the uniformly charged photosensitive belt 18 corresponding to an image signal to form an electro-static latent image on the photosensitive belt 18. Next, one of the developing unit 21, for example, the yellow color developing unit 21Y develops the electro-static latent image formed on the photosensitive belt 18 using yellow color toner to form a yellow color visual image (toner image). The visual image of that color is transferred to the intermediate transfer drum 25 at the nip portion where the photosensitive belt 18 and the intermediate transfer drum 25 contact each other. Then, the photosensitive belt 18 is discharged, cleaned, charged and exposed to form an electro-static latent image (image of magenta color) on its surface while it is rotating once. When the electro-static latent image arrives at the portion of the developing unit 21, the magenta color developing unit 21M, for example, develops the electro-static latent image formed on the photosensitive belt 18 using magenta color toner to form a magenta color visual image. The visual image is transferred to the intermediate transfer drum 25 at the nip portion to be superposed on the yellow color image having previously been transferred. Similarly, developing and transferring using cyanic color toner is performed with the cyanic color developing unit 21C, and developing and transferring using black color toner is performed with the black color developing unit 21B. When transferring of all colors on the intermediate transfer drum 25 is completed, the transfer roller 27 provided beside the intermediate transfer drum 25 is moved to a position to touch to the intermediate transfer drum 25. With starting of the movement of the photosensitive belt 18 and the rotation of the intermediate transfer drum 25, the pick-up roller 11 and the registration roller 12 are started to rotate, and the printing paper 10 in the paper feed cassette 9 enters a printing paper transporting portion by engaging with the pick-up roller 11. Then the printing paper 10 is transported to the transfer portion through the rotating registration roller 12 synchronized with the transportation of the visual color image on the intermediate transfer drum 25 to the transfer portion. At the transfer portion, the visual color image on the intermediate transfer drum 25 is transferred to the printing paper 10 with the transfer voltage applied to the transfer roller 27. Then the printing paper 10 is transported to the fixing unit 13 to fix the visual color image on it. Finally, the printing paper 10 is extracted to the outside of the image forming apparatus through the paper extract roller 14.

Then, after the photosensitive belt 18 has transferred the four color toner image to the intermediate transfer drum 25, the remaining potential on the photosensitive belt 18 is removed with the discharging lamp 22, and the remaining toner on the photosensitive belt 18 is removed with the belt cleaner 23. On the other hand, after the visual color image is transferred to the printing paper 10, the remaining potential on the intermediate transfer drum 25 is removed with the discharger 28, and then the toner remaining on the intermediate transfer drum 25 is removed with the drum cleaner 29. Thus a series of the image forming process is completed.

In a series of the operations described above, the drum cleaner 29 is maintained at a side position while the visual image is formed on the intermediate transfer drum 25. The charger 26 works so that the toner potential is applied only immediately before a visual color image on the intermediate drum 25 is transferred to the printing paper 10. Similarly, the transfer roller 27 is moved to a side position until the visual image is finished and completely transferred to the intermediate transfer drum 25, and roller 27 is kept in a separated condition with respect to the intermediate transfer drum 25. The transfer voltage control and generating circuit 8 is nearly of the same structure as shown in FIG. 2.

Figure 5:
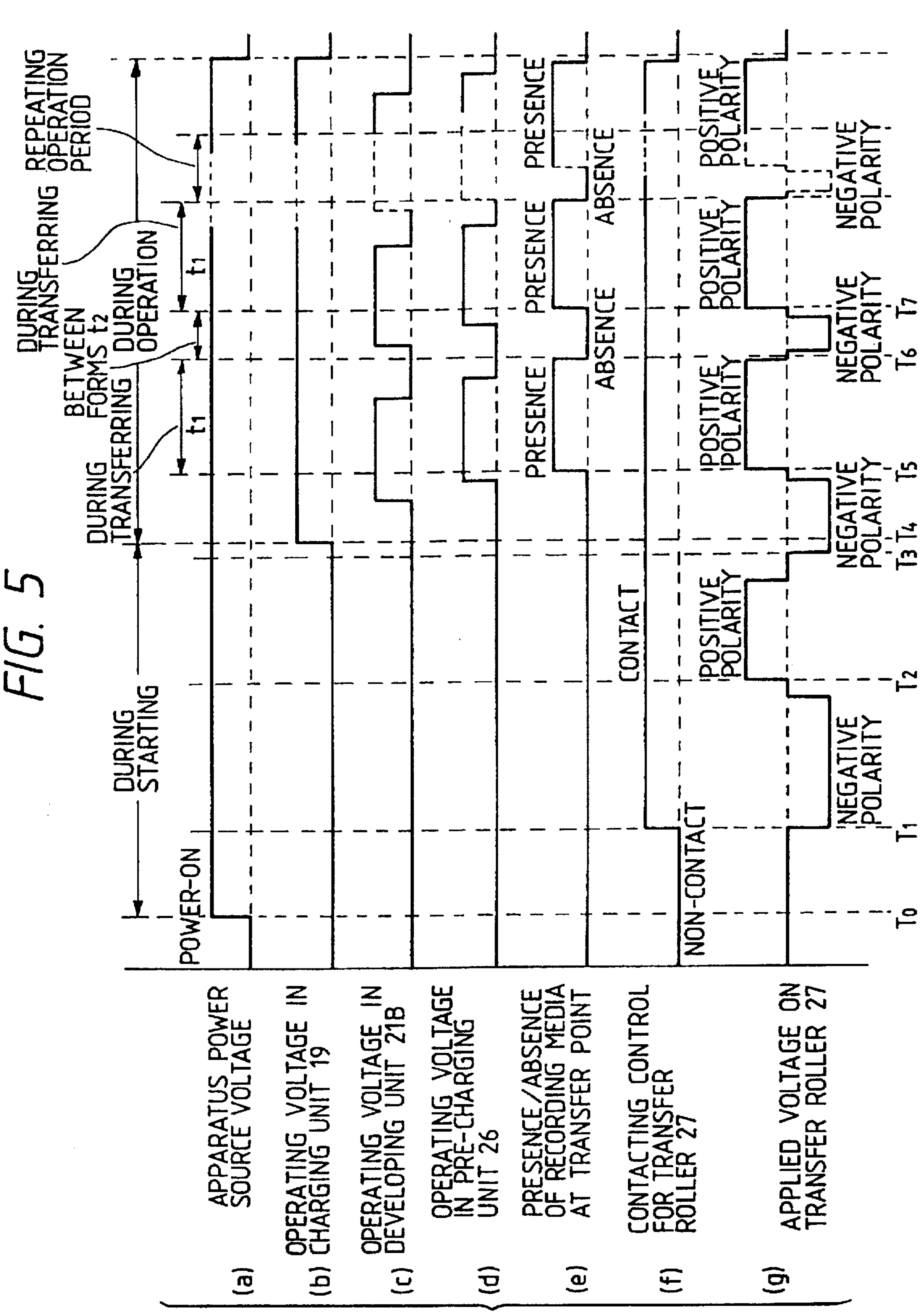
FIG. 5 is a timing chart showing an example of change in states of various signals during performing mono-color printing in a second embodiment.
Figure 6:
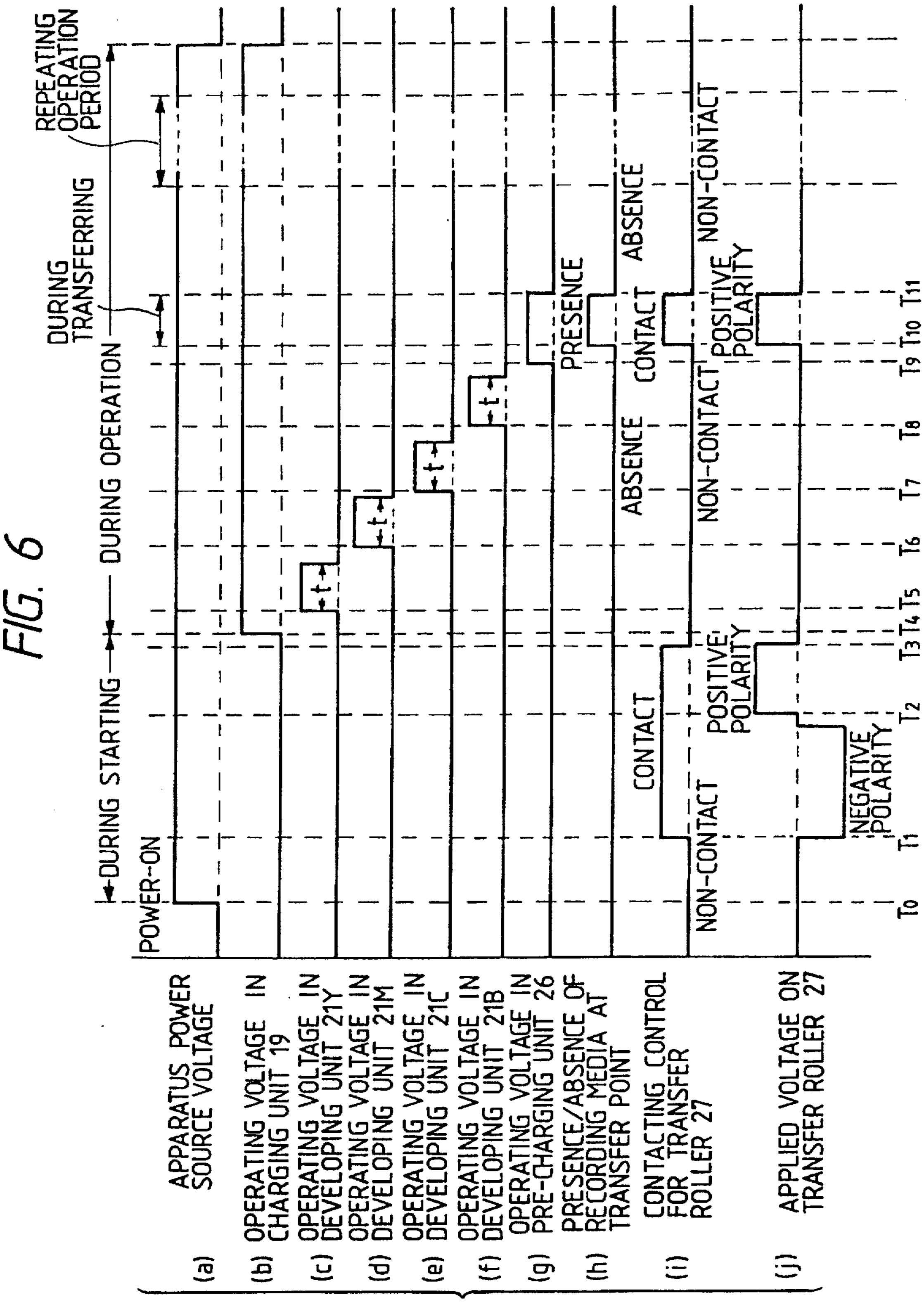
FIG. 6 is a timing chart showing an example of change in states of various signals during performing multi-color printing in a second embodiment.

FIG. 5 is a timing chart showing an example of changes in various signal states in the construction shown in FIG. 4 when mono-color printing is performed. FIG. 6 is a timing chart showing am example of changes in various signal states in the construction shown in FIG. 4 when multi-color printing is performed.

In FIG. 5, (a) shows the power source voltage for the image forming apparatus, (b) shows the operating voltage of charger 19, (c) shows the operating voltage of the black color developing unit 21B, (d) shows the operating voltage of the charger 26, (e) shows the signal indicating presence/absence of the printing paper 10 in the transfer position, (f) shows the touching/detaching state of the transfer roller 5, and (g) shows the voltage applied to the transfer roller 27.

In FIG. 6, (a) shows the power source voltage for the image forming apparatus, (b) shows the operating voltage of the charger 19, (c) shows the operating voltage of the yellow color developing unit 21Y, (d) shows the operating voltage of the magenta color developing unit 21M, (e) shows the operating voltage of the cyanic color developing unit 21C, (f) shows the operating voltage of the black color developing unit 21B, (g) shows the operating voltage of the charger 26, (h) shows the signal indicating presence/absence of the printing paper 10 in the transfer position, (i) shows the touching/non-touching state of the transfer roller 5, and (j) shows the voltage applied to the transfer roller 27.

Explanation will be given of the voltage applied state of each of the portions and of the corresponding operation of each of the portions during the starting period and during operation in the embodiment shown in FIG. 4 when mono-color image printing is performed, referring to FIG. 5.

Firstly, at time $T_0$, the power of the image forming apparatus is switched on. On building-up of the power source voltage, the image forming apparatus starts to operate. On this occasion, the power source switching-on described above is not limited to that at the beginning of routine use of the image forming apparatus, but includes the switching-on again of the image forming apparatus after solving a trouble, such as a jam. At this time, the chargers 19, 26 and the black color developing unit 21B are not supplied with operating voltage, and the transfer roller 27 is not in contact with the intermediate transfer drum 25 or provided with voltage, and the transfer portion is not supplied with printing paper.

Next, at time $T_1$, the photosensitive belt 18 starts to move, the intermediate transfer drum 25 and the transfer roller 27 start to rotate, the transfer roller 27 being in touch with the intermediate transfer drum 25. Concurrently, the CPU 17 transmits a control signal to the high voltage power source 16 having negative polarity in order to operate the high voltage power source 16 having negative polarity to supply the transfer roller 27 with negative polar voltage of −400 to −800V for a first term of a certain interval, for example 10 to 60 seconds. In a case of mono-color image printing, the transfer roller 27 is kept in touch with intermediate transfer drum 25 until a series of image printing is completely finished.

Then, at a time $T_2$ after the first term, the CPU 17 transmits a signal to the high voltage power source 15 having positive polarity to supply the transfer roller 27 with positive polar voltage of 800 to 2000V for a second term of a certain interval, for example 5 to 20 seconds.

Further, at time $T_3$ after the second term, the CPU 17 again transmits a signal to the high voltage power source 16 having negative polarity to supply the transfer roller 27 with the negative polar voltage of −400 to −800V.

And at time $T_4$ during the state where this negative voltage is being supplied, the starting-up period is completed and the apparatus enters the operating period where the image forming apparatus is capable of performing image printing. In the operating period, the charger 19 is supplied with operating voltage, then the black color developing unit 21B is also supplied with operating voltage and, finally the charger 26 is also supplied with operating voltage. Further, the units placed around the photosensitive belt 18 such as the exposing means 20, for example a laser optical system, and the erase lamp 22 enter into the operating state and are capable of performing their given functions. In this state, a black-color image is formed on the photosensitive belt 18 and is immediately transferred to the intermediate transfer drum 25. However, the printing paper 10 is not yet fed to the transfer portion.

At the time $T_5$ when the front end of the printing paper 10 is transported to the point of the transfer portion, the CPU 17 transmits a signal to the high voltage power source 15 having positive polarity to supply the transfer roller 27 with positive polar voltage of 800 to 2000V in order to transfer the toner image formed on the intermediate transfer drum 25 to the printing paper 10. On this occasion, during the transfer interval $t_1$, where the positive polar voltage is applied to the transfer roller 27, the printing paper 10 is passing the transfer portion. Immediately before the end of the transfer interval $t_1$, the supply of operating voltage to the black color developing unit 21B is stopped, and then the supply of operating voltage to the charger 26 is also stopped.

At the time $T_6$, at the end of the transfer interval $t_1$, the supplying of the transfer voltage having positive polarity is stopped. During the non-transfer interval after the supply of the transfer voltage having positive polarity is stopped and before the next supplying of the transfer voltage having positive polarity, that is, a between-paper interval $t_2$ between one printing paper 10 and the next printing paper 10, the CPU 17 transmits a signal to the high voltage power source 16 having negative polarity to supply the transfer roller 27 with negative polar voltage of −400 to −800V. On this occasion, during the non-transfer interval $t_2$, the black color developing unit 21B is again supplied with operating voltage, and successively the charger 26 is supplied with operating voltage.

At the time $T_7$ when the front end of the printing paper 10 is transported to the point of the transfer portion, the CPU 17 again transmits a signal to the high voltage power source 15 having positive polarity to supply the transfer roller 27 with positive polar voltage of 800 to 2000V for the interval $t_1$ in order to transfer the toner image formed on the intermediate transfer drum 25 to the next printing paper 10.

The operation following to the above is a repetition of the operation described above. During each transfer interval $t_1$ when the printing paper 10 is transported to the point of the transfer portion, the transfer roller 27 is supplied with the positive polar transfer voltage of 800 to 2000V to perform transference of the visual image to the printing paper 10. On the other hand during each non-transfer interval $t_2$ when the printing paper 10 is absent from the point of the transfer portion, the transfer roller 27 is supplied with the negative polar transfer voltage of −400 to −800V.

Although the description has been made on a case where black color is used as the mono-color in image printing, the color for the image printing is not limited to black. When any one of the other color developing units 21Y, 21M and 21C is selected for use, a mono-color image printing in yellow, magenta or cyanic color can be performed.

Explanation will be given in the voltage applied state of each of the portions and of the corresponding operation of each of the portions during the starting period and during operation in the embodiment shown in FIG. 4 when multi-color (four color) image printing is performed, referring to FIG. 6.

Firstly, at time $T_0$, the power of the image forming apparatus is switched on. On building-up of the power source voltage, the image forming apparatus starts to operate. On this occasion, the power source switching-on described above is not limited to that at the beginning of routine use of the image forming apparatus, but includes the switching-on again of the image forming apparatus after solving a trouble, such as a jam. At this time, the chargers 19, 26 and the color developing units 21Y, 21M, 21C and 21B are not supplied with operating voltage, and the transfer roller 27 is not in contact with the intermediate transfer drum 25 or supplied with voltage, and the transfer portion is not supplied with printing paper.

Next, at time $T_1$, the photosensitive belt 18 starts to move, the intermediate transfer drum 25 and the transfer roller 27 start to rotate, the transfer roller 27 being in touch with the intermediate transfer drum 25. Concurrently, the CPU 17 transmits a control signal to the high voltage power source 16 having negative polarity in order to operate the high voltage power source 16 having negative polarity to supply the transfer roller 27 with negative polar voltage of −400 to −800V for a first term of a certain interval, for example 10 to 60 seconds.

Then, at a time $T_2$ after the first term, the CPU 17 transmits a signal to the high voltage power source 15 having positive polarity to supply the transfer roller 27 with positive polar voltage of 800 to 2000V for a second term of a certain interval, for example 5 to 20 seconds.

Further, at a time $T_3$ after the second term, the transfer roller 27 is stopped, and concurrently the transfer roller 27 is moved away from the intermediate transfer drum 25.

And at time $T_4$, the starting-up period is completed and the apparatus enters the operating period where the image forming apparatus is capable of performing image printing. In the operating period, the charger 19 is supplied with operating voltage.

Then, at time $T_5$, the yellow color developing unit 21Y is supplied with operating voltage for a short period to form a yellow color toner image on the photosensitive belt 18, the yellow toner image being immediately transferred to the intermediate transfer drum 25.

Successively, at time $T_6$, the magenta color developing unit 21M is supplied with operating voltage for a short period to form a magenta color toner image on the photosensitive belt 18, the magenta toner image being immediately transferred and superposed on the yellow color toner image which has been transferred on the intermediate transfer drum 25.

Further, at time $T_7$, the cyanic color developing unit 21C is supplied with operating voltage for a short period to form a cyanic color toner image on the photosensitive belt 18, the cyanic toner image being immediately transferred and superposed on the yellow color toner and magenta color toner images which have been transferred on the intermediate transfer drum 25.

Furthermore, at time $T_6$, the black color developing unit 21B is supplied with operating voltage for a short period to form a black color toner image on the photosensitive belt 18, the black toner image being immediately transferred and superposed on the three color toner images which have already been transferred on the intermediate transfer drum 25.

At time $T_9$, the charger 26 is supplied with operating voltage to charge the surface of the intermediate transfer drum 25 uniformly.

At the time $T_{10}$ just after time $T_9$, when the front end of the printing paper 10 is transported to the point of the transfer portion, the transfer roller 27 is again brought in touch with the intermediate transfer drum 25, and concurrently the CPU 17 transmits a signal to the high voltage power source 15 having positive polarity to supply the transfer roller 27 with positive polar voltage of 800 to 2000V in order to transfer the four colored toner image formed on the intermediate transfer drum 25 to the printing paper 10.

At the time $T_{11}$, when the rear end of the printing paper 10 has passed the point of the transfer portion, the transfer voltage having positive polarity is stopped and the transfer roller 27 moved away from the intermediate transfer drum 25. A little time after $T_{11}$, the charger 26 is stopped being supplied with operating voltage, and a color image is printed on a sheet of printing paper 10.

The operation following the above is repetition of the operations from $T_5$ to $T_{11}$ described above for every input of the image printing command. During the transference interval when the printing paper 10 is at the transfer portion, the transfer roller 27 is supplied with the positive polar transfer voltage of 800 to 2000V to perform transference of the visual image to the printing paper 10. On the other hand, during the non-transfer interval when the printing paper 10 is absent from the transfer portion, the transfer roller 27 is not supplied with any voltage, and the image forming apparatus is in a stand-by state waiting for the next command.

Although the description has been made in a case where a color image formed of four colors, yellow, magenta, cyanic and black colors, is printed, the colors for the image printing are not limited to those four colors. Two or three among the color developing units 21Y, 21M and 21C may be selected for two-color or three-color printing. It is also possible to use other colors instead of the four colors described above.

Although it has been described in the above embodiment that the transfer roller 27 is supplied once with the negative polar voltage and successively with the positive polar voltage at starting, the present invention does not limit the times of supplying the negative polar voltage and successively the positive polar voltage to once. The times of supplying these voltages may be twice or more. However, as described above, it is preferable that the times of supplying voltages be once or twice.

The interval of supplying the negative polar voltage and the interval of supplying the positive polar voltage may be the same or may be different. And the ranges of the negative polar voltage and the positive polar voltage are not limited to the ranges of voltages described above.

According to the present invention, the transfer roller 27 is supplied once or more with the negative polar voltage and successively with the positive polar voltage at the starting of the image forming apparatus. Therefore, whichever polarity the toner held on the photosensitive belt 18 or the intermediate transfer drum 25 is charged in, the toner is not attracted and attached to the transfer roller 27. Further, since the apparatus has a cleaning function against the toner attached to the transfer roller 27, the toner does not become attached on the reverse side surface of printing paper 10, and so the reverse side stain is not caused.

Further, it is possible to prevent generating of an image defect such as overlap due to memory effect in the photosensitive drum 1. With excellent transference of visual image, a high quality color printed image can be obtained. Furthermore, continuous printing can be also be performed smoothly and speedily while keeping an excellent transfer state.

According to the present invention, as described above, the transfer roller (transfer means) 5, 27 is supplied once or more with the negative polar voltage and successively with the positive polar voltage at the starting of the image forming apparatus without operating the charger (charging means) 2, 26 and/or the developing units 4, 21. As a result, toner attached on the transfer roller 5, 27 under the condition where the toner exists on the photosensitive belt (image holding member) 18 or on the intermediate transfer drum 25 is prevented from attaching to the transfer roller 5, 27. Therefore, the toner does not become attached to the reverse side surface of the printing paper (printing medium) 10, and it is always possible to perform transferring of an excellent visual image (toner image). Further, since a memory effect does not arise on the photosensitive belt 18 or the intermediate transfer drum 25, there is an advantage of performing a high quality image printing without image defect. Furthermore, according to the present invention, in performing continuous image printing, the transfer roller (transfer means) 5, 27 is applied with voltage having the same polarity as the charged polarity of toner or, the entire voltage is stopped when no printing paper (printing medium) 10 exists at the transfer portion. Therefore, memory effect does not arise on the photosensitive belt (image holding member) 18 or the intermediate transfer drum 25. In addition to this, since it is capable of transferring a desirable visual image (toner image) without requiring the time to repeat reversing the polarity of applied voltage, there is an advantage that excellent continuous image printing or color image printing can be performed.

We claim:

1. An image forming apparatus comprising an image holding member, charging means for uniformly charging said image holding member, exposing means for forming an electro-static latent image on said image holding member when said image holding member is charged uniformly, visual image forming means for forming a visual image by developing the electro-static latent image, transfer means for transferring the visual image to a printing medium, transport means for transporting the printing medium to said transfer means, a voltage source, and control means for controlling said voltage source so as to be operative during an interval after starling of operation of said image forming apparatus and before the printing medium is transported to said transfer means to apply to said transfer means during said interval a sequence of (1) voltage of one polarity for a first period of time, followed by (2) voltage of opposite polarity for a second period of time.

2. An image forming apparatus according to claim 1, wherein said control means controls said voltage source to apply the voltage sequence while said charging means and said visual image forming means are not operated.

3. An image forming apparatus according to claim 1, wherein the first period of time is different from the second period of time.

4. An image forming apparatus according to claim 1, wherein said control means controls said voltage source to apply voltage to said visual image forming means, and to apply the voltage to said transfer means with polarity opposite the polarity of the voltage applied to said visual image forming means.

5. An image forming apparatus comprising an image holding member, charging means for uniformly charging said image holding member, exposing means for forming an electro-static latent image on said image holding member when said image holding member is charged uniformly, visual image forming means including a plurality of color developers for forming successive color visual images by successively developing successive electro-static latent images for each of the plurality of colors with said plurality of color developers, an intermediate transfer roller for forming a multi-color visual image by contacting said image holding member and superposing each of the successive color visual images on said intermediate transfer roller, transfer means for transferring said multi-color visual image to a printing medium, transport means for transporting the printing medium to said transfer means, a voltage source, and control means for driving said transfer means to selectively bring said transfer means into and out of contact with said intermediate transfer roller and for controlling said voltage source so as to be operative during an interval after starting of operation of said image forming apparatus and before the printing medium is transported to said transfer means to apply to said transfer means during said interval a sequence of (1) voltage of one polarity for a first period of time, followed by (2) voltage of opposite polarity for a second period of time.

6. An image forming apparatus according to claim 5, wherein said control means controls said voltage source to apply voltage to said visual image forming means, and to apply the voltage to said transfer means with polarity opposite the polarity of the voltage applied to said visual image forming means while said control means is bringing said transfer means into contact with said intermediate transfer means.

7. An image forming apparatus according to claim 5, wherein said control means controls said voltage source so that voltage is not applied to said transfer means while said transfer means is not in contact with said intermediate transfer roller.

* * * * *